United States Patent [19]
Kim et al.

[11] Patent Number: 5,842,108
[45] Date of Patent: Nov. 24, 1998

[54] MECHANO-CHEMICAL PROCESS FOR PRODUCTION OF HIGH DENSITY AND ULTRAFINE W/CU COMPOSITE MATERIAL

[75] Inventors: Byoung-Kee Kim; Gil-Geun Lee, both of Kyungsangnam-do; Gook-Hyun Ha, Pusan; Dong-Won Lee, Kyungsangnam-do, all of Rep. of Korea

[73] Assignee: Korea Institute of Machinery & Materials, Chungcheongnam-do, Rep. of Korea

[21] Appl. No.: 910,672

[22] Filed: Aug. 13, 1997

[30] Foreign Application Priority Data

Mar. 4, 1997 [KR] Rep. of Korea ............ 1997-7046

[51] Int. Cl.⁶ ........................................ B22F 3/12
[52] U.S. Cl. ............................ 419/33; 419/34; 419/38; 419/39; 419/44; 419/47; 419/55; 419/58
[58] Field of Search .................. 419/33, 34, 38, 419/39, 44, 47, 55, 58

[56] References Cited

U.S. PATENT DOCUMENTS

| | | | |
|---|---|---|---|
| 2,467,675 | 4/1949 | Kurtz et al. | 75/22 |
| 3,382,066 | 5/1968 | Kenney et al. | 75/208 |
| 3,551,992 | 1/1971 | Maykuth et al. | 29/420.5 |
| 5,413,751 | 5/1995 | Polese et al. | 419/23 |
| 5,439,638 | 8/1995 | Houck et al. | 419/30 |
| 5,686,676 | 11/1997 | Jech et al. | 75/247 |

OTHER PUBLICATIONS

Journal of Materials Science 13 (1978) 2703–2711; Cooper–tungsten Composite Powders by the Hydrogen Reduction of Copper Tungstate; A.K. Basu, F.R. Sale.

The International Journal of Powder Metallurgy, vol. 30, No. 1; Chemically Activated Liquid Phase Sintering of Tungsten–Cooper; J.L. Johnson and R. M. German.

Solid State Phenomena vol. 25 & 26 (1992) pp. 143–150; Microhomogeneity and Sintering of W–Cu Composite Powders Produced by Hydrogen Reduction; J.S. Lee and T.H. Kim.

Metallurgical Transactions A vol. 24A, Nov. 1993; Phase Equilibria Effects on the Enhanced Liquid Phase Sintering of Tungsten–Copper; J.L. Johnson and R. M. German.

Transactions of the PMAI, vol. 11, 1984; Preparation and Properties of Copper Coated Tungsten Powder; KS Samant, MN Vakharia and P. Ramakrishnan.

Journal of Materials Science; The Controlled Reduction of Copper Tungstate in H20/H2 Mixtures; A.K. Bas.

MPR Apr. 1997; Nippon Tungsten Advances W–Cu Composites; Sinji Gotoh, Noriyuki Hara and Yasunao Kai.

ASM Handbook, "Powder Metallurgy", vol. 7, 1984, pp. 73–78, 173–175.

*Primary Examiner*—Daniel J. Jenkins
*Attorney, Agent, or Firm*—Schmeiser, Olsen & Watts

[57] ABSTRACT

A method for producing high density and ultrafine W/Cu bulk material by a mechano-chemical process is disclosed. In the method of this invention, metal salts as start materials are spray-dried and prepare W—Cu precursor powder having uniformly-dispersed tungsten and copper components. The W—Cu precursor powder in turn is subjected to a desalting and milling process, thus preparing W—Cu oxide composite powder. Thereafter, the W—Cu oxide composite powder may be formed into a formed green body prior to reducing and sintering under hydrogen atmosphere.

1 Claim, 3 Drawing Sheets

MECHANO-CHEMICAL PROCESS FOR PRODUCTION OF HIGH DENSITY AND ULTRAFINE W/CU COMPOSITE MATERIAL

BACKGROUND OF THE INVENTION

1. Field of the Invention

The present invention relates to a method for producing high density and ultrafine W/Cu bulk material by mechano-chemical process.

2. Description of the Prior Art

As well known to those skilled in the art, W/Cu composite alloy is preferably used for producing heat sinker materials or various munitions parts. However, W and Cu individually have no relative solubility so that it is almost impossible to produce a dense structure material using only W and Cu. In order to produce a high density W/Cu alloy, sintering activators such as Co (cobalt), Fe (iron) or Ni (nickel) are added to W/Cu to increase density. However, such sintering activators reduce the electric and thermal properties of a W/Cu alloy, and causes the growth of tungsten particles, thus reducing the mechanical properties of W/Cu alloy.

Recently, some methods to produce W/Cu alloy by using milled and mixed oxide powder or Cu-coated powder were tried to overcome the above problem. However, the above methods are problematic in that they cause an introduction of impurities during a lengthy milling process and the growth of tungsten particles at a high sintering temperature. Another problem of the above methods resides in that they also complicate the process of producing W/Cu alloy.

SUMMARY OF THE INVENTION

Accordingly, the present invention has been made keeping in mind the above problems occurring in the prior art, and an object of the present invention is to provide a method for producing high density and ultrafine W/Cu composite material without addition of sintering activators by mechano-chemical process, which is free from both an introduction of impurities and the growth of tungsten particles during a process of producing W/ Cu alloy.

In order to accomplish the above object, the present invention provides a method for producing high density and ultrafine W/Cu bulk material, comprising the steps of spray-drying of metal salts as start materials, thus preparing spray-dried precursor powder having uniformly-dispersed tungsten and copper components, and desalting and milling of the spray-dried powder thus preparing W—Cu oxide composite powder. Thereafter, the W—Cu oxide composite powder may be formed into a formed green body prior to reducing and sintering under hydrogen atmosphere.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a graph showing the progressive rate of temperature in the method of this invention, in which:

FIG. 3 is a SEM photograph (magnifications: ×5000) showing the cross-sections of W/Cu bulk materials produced in accordance with this invention, in which:

DESCRIPTION OF THE PREFERRED EMBODIMENTS

Figure 1:
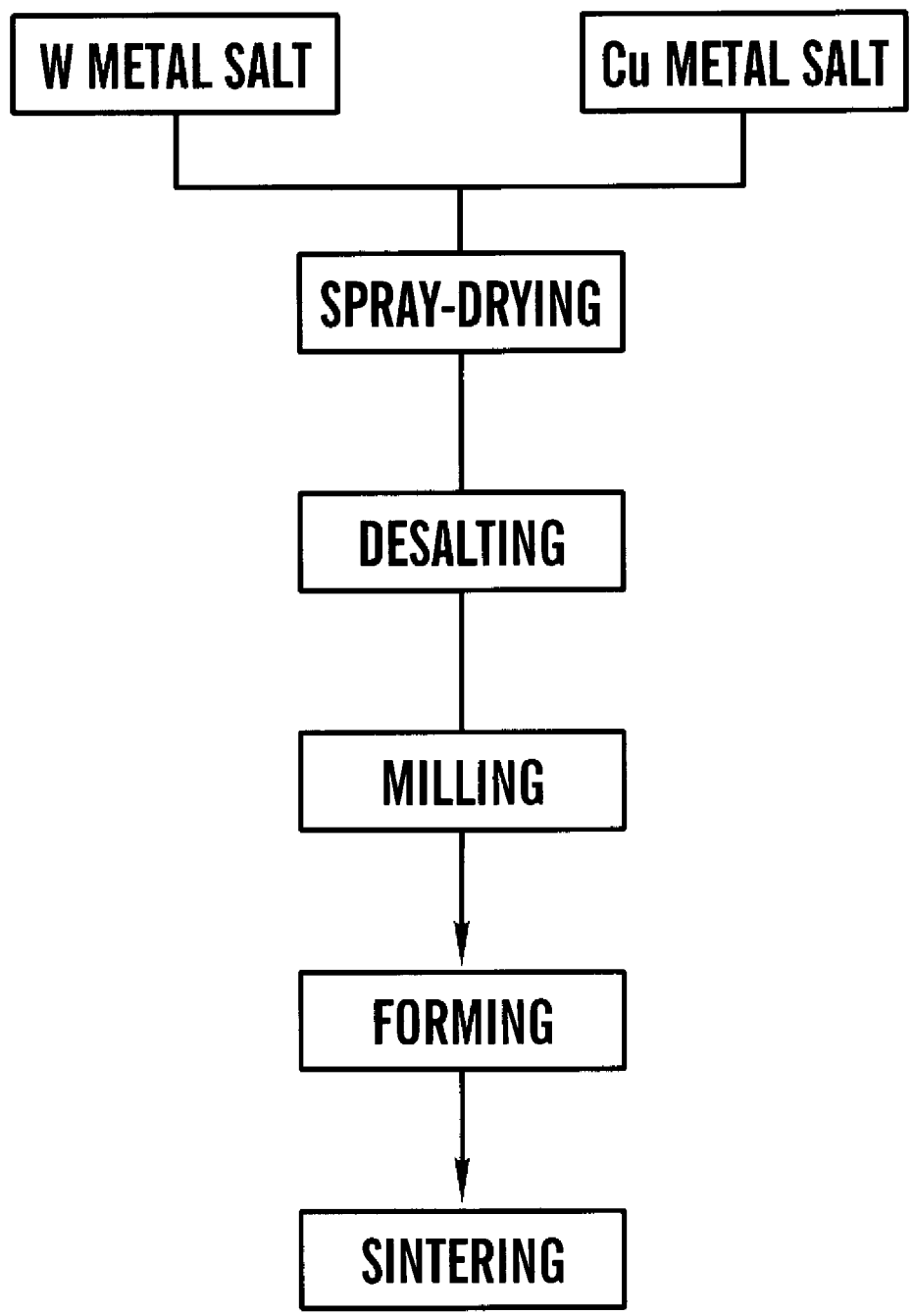
FIG. 1 is a flowchart of the method according to this invention.

FIG. 1 is a flowchart of the method of producing W/Cu composite material according to this invention.

As shown in the flowchart, the method of this invention comprises the first step of chemically mixing start materials: tungsten metal salt and copper metal salt through a spray-drying process thus producing precursor powder including uniformly-dispersed tungsten and copper components. Then the precursor powder made from the spray-drying process is subjected to both a desalting process and a milling process thus preparing W—Cu oxide composite powder. The W—Cu oxide composite powder obtained from the milling process is subjected to a forming process prior to simultaneously reducing and sintering of the formed green body of the W—Cu oxide composite powder, thus producing a W/Cu bulk material.

Hereinbelow, the method of mechano-chemically producing high density and ultrafine W/Cu bulk material according to the invention will be described in detail in order of process.

The method according to the primary embodiment of this invention is processed as follows.

Process for making W—Cu Oxide Composite Powder

An aqueous solution, including tungsten metal salt and copper metal salt (object composition : W-10~30 wt %Cu), was subjected to a spray-drying process under the condition of 250° C. (container temperature), 11,000 rpm (nozzle rotation velocity) and 20 ml/min (flow rate of aqueous solution) thus producing precursor powder with uniformly-dispersed tungsten and copper components. The precursor powder obtained from the spray-drying process was desalted and dehydrated at 750° C. for 2 hrs. in the air atmosphere, thus preparing W—Cu oxide composite powder.

Milling Process

The above W—Cu oxide composite powder was milled with rotation ball mill for 2 hrs. in the air atmosphere, thus mechanically pulverizing the W—Cu oxide composite powder. In this process, the weight ratio of the ball to the W—Cu oxide composite powder was 50 : 1. 1 wt % of paraffin as a milling additive was added to the W—Cu oxide composite powder.

Forming and Sintering Processes

The W—Cu oxide composite powder obtained from the milling process was subjected to a forming process at a forming pressure of 1 t/cm$^2$. Thereafter, the milling additive (paraffin) was removed from the green body of W—Cu oxide composite powder at 550° C. for 2 hrs. in the air atmosphere, thus preparing a formed green body.

Figure 2:
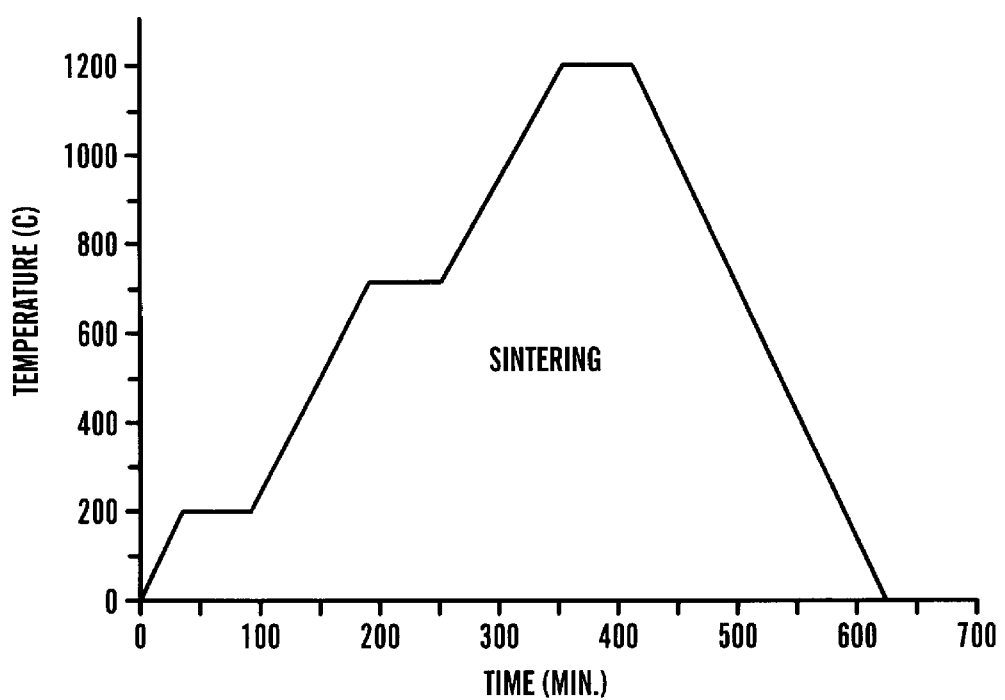

FIG. 2 is a graph showing an example of the progressive rate of temperature in a sintering process according to this invention. That is, this graph shows temperature as a function of time in such a sintering process. During the sintering process, the temperature increased under hydrogen atmosphere at the progressive rate shown in the graph of FIG. 2, while the formed green body of W—Cu oxide composite powder was primarily reduced at 150°–250° C. for 1 hr. and was secondarily reduced at 600°–800° C. for 1 hr. prior to sintering at a temperature of higher than the melting point (1,083 ° C.) of copper by about 50° C. for 1 hr. In the sintering process, the temperature was constantly increased at a progressive rate of 5° C./min.

The properties of the high density W/Cu bulk material produced according to the invention were tested and the testing results are given in the following Table.

The following Table shows relative density of sintered bodies relative to theoretical density with various embodiments for W-20wt % Cu composition.

TABLE

Relative Densities of Sintered Bodies

| embodiments | reduction | sintering | relative density |
|---|---|---|---|
| W + Cu* | — | 1200° C./1hr. | 85.5% |
| W – Cu oxide** | — | 1200° C./1hr. | 90.8% |
| W – Cu oxide** | 200° C./1hr + 600° C./1hr. | 1200° C./1hr. | 98.7% |
| W – Cu oxide** | 200° C./1hr + 700° C./1hr | 1200° C./1hr. | 99.9% |
| W – Cu oxide** | 200° C./1hr + 800° C./1hr | 1200° C./1hr. | 98.5% |

*a formed green body of conventional composite powder with 0.51μmW and 20μmCu.
**a formed green body of W – Cu oxide composite powder.

For comparison, the first row of the Table shows the relative density of a sintered body of conventional composite powder with 0.51 μm tungsten powder and 20 μcopper powder. As shown in the Table, the relative density of the sintered body according to this invention varies in accordance with the secondary reduction temperature. Particularly, when the secondary reduction temperature is 700° C., the relative density of the sintered body is 99.9%, which is almost equal to the theoretical density.

Figure 3:
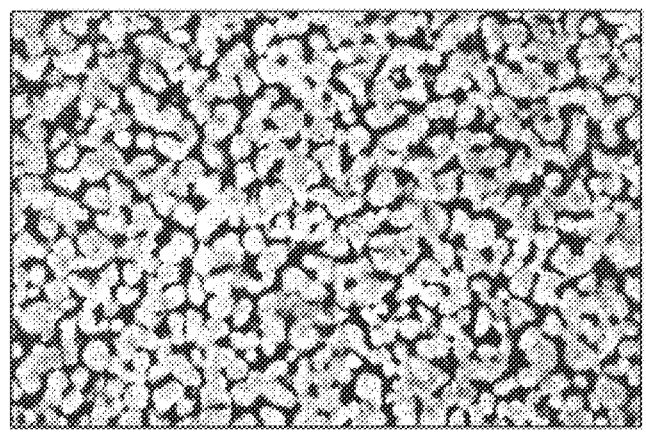

FIG. 3 is a SEM micrograph (magnifications: ×5,000) showing the cross-section of the W-20wt % Cu bulk materials produced in accordance with this invention. FIG. 3 shows the cross-section of a sintered body according to this invention which was produced by reduction (at 200° C. for 1 hr and at 700° C. for 1 hr) and sintering (at 1200° C. for 1 hr) of a formed green body of W—Cu oxide composite powder. In the SEM micrograph, the gray portion is a tungsten portion, while the black portion is a copper portion. As shown in the SEM micrograph, the method of this invention effectively produces a uniform sintered body with the average size of the tungsten particles of not higher than 1.0 μm.

As described above, the present invention provides a method of mechano-chemically producing high density and ultrafine W/Cu bulk material, having both an average size of tungsten particles of not higher than 1.0 μm and relative density of not lower than 98.5%, without addition of sintering activators causing a deterioration of the thermal property of the W/Cu bulk material.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for producing high density and ultrafine W/Cu bulk material by a mechano-chemical process, comprising the steps of:

spray-drying an aqueous solution of tungsten (W) and copper (Cu) metal salts (object composition: W—10~30 wt % Cu) under the condition of 250° C. of container temperature, 11,000 rpm of nozzle rotation velocity and 20 ml/min of flow rate of aqueous solution thus producing W—Cu precursor powder, and desalting and dehydrating W—Cu precursor powder at 750° C. for 2 hours in the air atmosphere, thus preparing W—Cu oxide composite powder;

milling W—Cu oxide composite powder using a rotation ball mill for 2 hours in the air atmosphere with both a weight ratio of ball to W—Cu oxide composite powder being 50: 1 and 1 wt % of paraffin as a milling additive being added to W—Cu oxide composite powder, thus mechanically pulverizing the W—Cu oxide composite powder; and forming the W—Cu oxide composite powder into a formed green body at a forming pressure of 1 t/cm$^2$, removing paraffin from the formed green body of the W—Cu oxide composite powder at 550° C. for 2 hours in the air atmosphere, primarily and secondarily reducing the formed green body under hydrogen atmosphere at 150°–250° C. for 1 hour and at 600°–800° C. for 1 hour, and sintering the green body at a temperature of higher than the melting point of copper by about 50° C. for 1 hour with temperature increasing rate of 5° C./min, thus producing W/Cu bulk material having a composition of W—10~30wt % Cu, an average size of tungsten particles of not higher than 1.0 μm and a density of not lower than 99.0% of a theoretical density.

* * * * *